US007015971B2

(12) United States Patent
Sirtori et al.

(10) Patent No.: US 7,015,971 B2
(45) Date of Patent: Mar. 21, 2006

(54) METHOD FOR CONVERTING THE SCANNING FORMAT OF IMAGES, A SYSTEM AND COMPUTER PROGRAM PRODUCT THEREFOR

(75) Inventors: Daniele Sirtori, Milan (IT); Matteo Maravita, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 573 days.

(21) Appl. No.: 10/171,793

(22) Filed: Jun. 14, 2002

(65) Prior Publication Data

US 2003/0026498 A1    Feb. 6, 2003

(30) Foreign Application Priority Data

Jun. 14, 2001    (EP) .................................. 01830397

(51) Int. Cl.
*H04N 7/01* (2006.01)

(52) U.S. Cl. ..................................................... 348/448

(58) Field of Classification Search ........ 348/447–449, 348/445, 450–452, 458, 459; 382/107, 232, 382/266, 300, 102, 299; 345/6
See application file for complete search history.

(56) References Cited

U.S. PATENT DOCUMENTS

| 5,278,647 A | * | 1/1994 | Hingorani et al. ..... 375/240.15 |
| 5,379,074 A | | 1/1995 | Hwang ........................ 348/606 |
| 5,532,751 A | | 7/1996 | Lui ............................. 348/452 |
| 5,602,654 A | | 2/1997 | Patti et al. .................... 358/461 |
| 5,786,862 A | * | 7/1998 | Kim et al. ................... 348/448 |
| 6,181,382 B1 | | 1/2001 | Kieu et al. ................... 348/459 |
| 6,421,090 B1 | * | 7/2002 | Jiang et al. .................. 348/452 |
| 6,483,928 B1 | * | 11/2002 | Bagni et al. ................. 382/107 |
| 6,545,727 B1 | * | 4/2003 | Pau et al. ..................... 348/700 |
| 2002/0171759 A1 | * | 11/2002 | Handjojo et al. ........... 348/452 |

FOREIGN PATENT DOCUMENTS

WO    WO 01/17244 A1    3/2001

OTHER PUBLICATIONS

De Haan, G. et al., "Deinterlacing—An Overview," *Proceedings of the IEEE*, 86(9):1839-1857, Sep. 1998.

* cited by examiner

*Primary Examiner*—Paulos M. Natnael
(74) *Attorney, Agent, or Firm*—Lisa K. Jorgenson; Robert Iannucci; Seed IP Law Group PLLC

(57) ABSTRACT

The conversion into a progressive format of digital images organized in half-frames or fields with interlaced lines or rows envisages selecting successive lines in one or more of said fields and reconstructing by pixels an image line set between the interlaced lines selected. The reconstruction operation obtains the image by creating a set of candidate patterns associated to the work window by selecting the patterns to be considered within the window. Next, applying to the patterns of the aforesaid set a first cost function which is representative of the correlations between pairs of pixels. Applying to the patterns of the aforesaid set a second cost function which is representative of the non-correlations between pairs of pixels. Selecting, for each candidate pattern, respective internal correlations and external non-correlations, calculating corresponding scores for the candidate patterns using the aforesaid first cost function. Selecting a best pattern by comparing the respective scores of the candidate patterns with at least one threshold; and selecting the pixels of the window identified by the best pattern selected, then reconstructing the missing line by filtration starting from said pixels.

39 Claims, 5 Drawing Sheets

METHOD FOR CONVERTING THE SCANNING FORMAT OF IMAGES, A SYSTEM AND COMPUTER PROGRAM PRODUCT THEREFOR

BACKGROUND OF THE INVENTION

1. Field of the Invention

The present invention relates to techniques that enable the conversion of the scanning format of digital images, in particular converting from an interlaced format to a progressive format.

2. Description of the Related Art

The technological limits that accompanied the original development of television transmissions imposed the need for transmission of images in "interlaced" format, according to which the pixels of the odd and even lines (also referred to as top and bottom lines) of an image are scanned and transmitted alternately.

The majority of the visual display devices currently existing (in particular, cathode-ray-tube television apparatuses) support this type of scanning for the incoming video signal. The refresh frequency and the persistence of the image on the human eye for these apparatuses is in fact such that the alternation of the odd and even lines is not perceived by the human eye. Consequently, the television standards used practically throughout the world (PAL, SECAM, and NTSC) adopt in fact the interlaced format.

The appearance of new technologies of construction of visual displays which enable screen dimensions to be obtained that are larger than current ones (for instance plasma displays can reach 40") has led to an increase in the quality of the information being displayed and accordingly an increase in the number of functions for processing the video signal.

Among the above functions one is precisely the conversion of scanning of the image from the interlaced format to the progressive format, which represents the ideal type of image for exploiting to the full the characteristics of the new visual displays.

Consequently, various categories of de-interlacing solutions have been developed, as evidenced, for example, by the following documents:

Pasi Pohjala, Matti Karlsson: Line rate upconversion in IDTV applications, IEEE Transactions on Consumer Electronics, Vol. 37, No. 3, pp. 309–312, August 1991;

Kai Oistamo, Yrjo Neuvo: A motion insensitive method for scan rate conversion and cross error cancellation, IEEE Transactions on Consumer Electronics, Vol. 37, No. 3, pp. 396–302, August 1991;

R. Simonetti, A. Polo Filisan, S. Carrato, G. Ramponi, G. Sicuranza: A deinterlacer for IQTV receivers and multimedia applications, IEEE Transactions on Consumer Electronics, Vol. 39, No. 3, pp. 234–240, August 1993;

H. Hwang, M. H. Lee, D. I. Song: Interlaced to progressive Scan Conversion with double smoothing, IEEE Transactions on Consumer Electronics, Vol. 39, No. 3, pp. 241–246, August 1993;

Dong-Ho Lee, Jong-Seok Park, Yung-Gil Kim: Video format conversion between HDTV Systems, IEEE Transactions on Consumer Electronics, Vol. 39, No. 3, pp. 219–224, August 1993;

Rob A. Beukeir, Imran A. Shah: Analysis of interlaced video signals and its applications, IEEE Transactions on Image Processing, Vol. 3, No. 5, pp. 501–512, September 1994;

P. Delogne, Laurent Cuvelier, Benoit Maison, Beatrice Van Caillie, Luc Vanderdorpe: Improved interpolation, motion estimation, and compensation for interlaced pictures, IEEE Transactions on Image Processing, Vol. 3, No. 5, pp. 482–491, September 1994;

Manfred Ernst: Motion compensated interpolation for advanced conversion and noise reduction, Proceedings 4th International Workshop on HDTV (Turin, Italy), Vol. 1, September 1991;

L. Capodiferro, A. Chiari, G. Marcone, S. Miceli: A screen format converter for HDTV, Proceedings 4th International Workshop on HDTV (Turin, Italy), Vol. 2, September 1991;

Bede Liu, Andre Zaccarin: A comparative study of coding of interlaced sequences with motion compensation, Proceedings 4th International Workshop on HDTV (Turin, Italy), Vol. 2, September 1991;

H. Blume, L. Schwoerer, K. Zygis: Subband based upconversion using complementary median filters, Proceedings International Workshop on HDTV (Turin, Italy), October 1994;

Dong Wook Kang: Two-channel spatial interpolation of images, Image Communication 16, pp. 395–399, 2000; and Feng-Ming Wang, Dimitris Anastassiou, Arun Netravali: Time-recursive deinterlacing for IDTV and Pyramid Coding, Image Communication 2, pp. 365–374, 1990.

With a certain degree of simplification, but with substantial adherence to the actual situation, the above previously known solutions fit into four basic categories, namely:

spatial techniques;

temporal techniques;

spatial-temporal techniques; and motion-compensated techniques.

The various solutions differ a great deal both in terms of complexity and in terms of hardware resources required.

Spatial techniques use only the data coming from the same half-frame or field. It is recalled that in the technical terminology of the sector the term 'frame' is used to indicate the entire image, whilst the terms 'half-frame' or 'field' are used to indicate the interlaced image made up of just odd lines or even lines. A frame is thus made up of two fields, referred to as top field and bottom field. In progressive scanning, both of these field are transmitted together, whereas in interlaced scanning the two fields are transmitted alternately.

Temporal techniques use data coming from one or more fields, which are subsequent and/or previous to the current field in which the missing data to be reconstructed reside.

Spatial-temporal techniques use both types of data, i.e., both spatial ones and temporal ones.

Finally, motion-compensated techniques are based on both spatial-temporal data and on the estimation of the movement of the various parts of which the image is made up (calculation of the motion vectors). This motion information can be calculated externally and can hence be supplied from outside the system in question, or else may be estimated inside the conversion system.

In general terms, a greater number of available data enables a higher level of performance to be achieved. However, it may also happen that an incorrect use of this amount of data (for example, in the case of techniques based upon motion compensation, an incorrect estimation of the motion-field values) leads the system to diverge from the ideal solution, introducing artifacts such as to degrade the quality of the reconstructed image.

BRIEF SUMMARY OF THE INVENTION

An embodiment provides an improved process for converting the scanning format of images, and in particular for converting the scanning format of digital images from an interlaced format to a progressive format, such as to overcome the typical drawbacks of the solutions present in the literature.

According to an embodiment of the present invention, the above purpose is achieved thanks to a process for scanning conversion which has the characteristics referred to specifically in the claims which follow. The invention also relates to the corresponding system and computer-program product which, once loaded into the memory of a computer and run thereon, enables the process according to the invention to be carried out.

In an embodiment according to the invention, the process makes it possible to take into consideration the ideal factors for its implementation on a digital circuit, namely, the factors regarding the computational complexity necessary, the power consumption of the system in the perspective of low-power applications, as well as the minimization of the requirements at a hardware level, the foregoing being combined, at the same time, with the search for, and achievement of, the best possible quantitative and qualitative results.

In addition, an embodiment of the process according to the invention does not formulate any hypothesis on the type of processing carried out on the input information before it is de-interlaced. This means simply that the function expressed is valid, in general, in a way irrespective of any possible encodings, decodings, treatment for reduction of noise, improvement of contrast and/or brightness and of any processing carried out on the television signal.

As regards the amount of storage area occupied, and hence the memory necessary for processing, it should be considered that a work window that is too small entails a reduced capacity for determining the objects and hence a poor reconstruction of the missing information. On the other hand, a work window that is too large may prove to be inefficient, oversized and hence unfavorable for the purposes of the complexity of the system.

In the spatial domain, the memory required for the work window is directly dependent upon the number N of rows or lines (the two terms "row" and "line" are used in an altogether equivalent way) of which the window is made up. In fact, assuming that the pixels that form the image enter the system in raster mode, also referred to as sequential mode (consider as the main field of application the real-time processing of television images), N lines for the work window correspond to N−1 delay lines-required, i.e., to N−1 line memories, plus the current line at input to the system.

In the time domain, each line making up the aforesaid work window may belong to images that are distant from one another in time. Each delay image (i.e., each additional field in the work window) involves complete storage thereof; in this case, memories are required of a size that can be a limitation on the practical implementation of a display device.

It should, in fact, be noted that between a line memory and a field memory there is a factor of proportionality equal to the number of lines per field (which, in the PAL standard, is 288).

As pointed out previously, there exist algorithms based on motion compensation. These may be divided into two distinct subclasses: with and without estimation of motion inside the system.

In the former case, it is necessary to have at least one image stored and the estimator of motion. In the latter case, even though the added complication of the estimator is not present, there is no control over the correctness of the motion data coming from outside, and it is therefore necessary to introduce functions of verification dedicated to this purpose, with a consequent increase in the overall complexity of the system.

As regards power consumption, this factor is directly linked to the computational complexity of the solution adopted, or, in other words, to the number of calculations made on average for processing. In general, the fundamental processing operations for the algorithms of the type described above are the measurement of the correlations between pixels, the comparison between the correlations themselves in order to determine the best solution, and, finally, the function of reconstruction of the missing information by means of specific filtering operators.

An embodiment according to the invention is thus based on the possible extension to patterns that are different from rectangles and parallelograms, namely to patterns that are trapezoidal or triangular. The invention enables a proper equilibrium to be achieved between the characteristics so far described, in such a way as to be able to define an optimal hardware configuration according to the qualitative results attained and thus render the invention easily integrable in television applications.

BRIEF DESCRIPTION OF THE SEVERAL VIEWS OF THE DRAWING(S)

The present invention will now be described, purely by way of non-limiting example, with reference to the attached drawings, in which.

DETAILED DESCRIPTION OF THE INVENTION

An embodiment according to the invention envisages carrying out the conversion of the scanning format of a digital video signal from an interlaced format to a progressive format, using linear and non-linear filtering techniques. The above process is performed on the basis of polygonal recognition of the objects and/or of their neighborhood.

Figure 1:
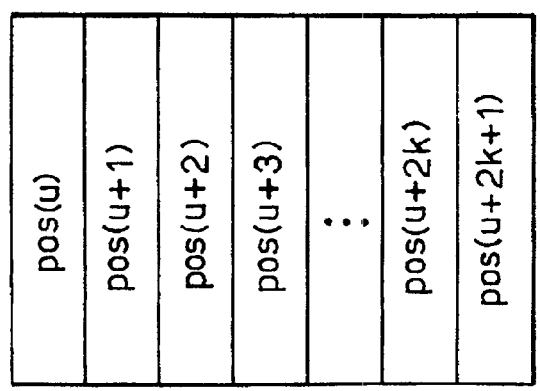
FIG. 1 illustrates the field structure processed using the process according to the invention.

In FIG. 1, the reference F designates, as a whole, a video-signal field, the lines of which are designated generically by pos(j), with j=1, ..., n, where the missing lines, i.e., the ones on which the pixels to be reconstructed lie, are in general designated by pos(u+2k+1).

Figure 2:
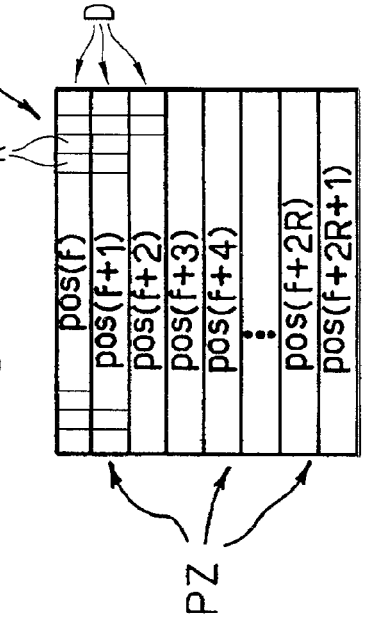
FIG. 2 is a general illustration of the structure of the work window of the solution according to the invention.

The working area of FIG. 2 is made up of a window W defined by portions PZ consisting of R consecutive pixels belonging to D consecutive video lines. Comprised among these video lines is the missing line ML where the pixel of the image that is to be reconstructed lies.

In particular, in FIG. 2 the lines of the current field are designated by pos(f+2R), whilst pos(f+2R+1) designates the lines of the previous/next field/fields which may be motion dependent/non-dependent.

It is to be recalled that no hypothesis is formulated on the position of the portions PZ selected, on the balancing and on the number of pixels R, or on the video lines D selected either. By the term "balancing" is meant the selection of data in such a way as to consider the point or pixel to be reconstructed at the exact center of the work window.

As will emerge clearly from what follows, the choice illustrated is not to be considered imperative for the purposes of the implementation of the invention.

On the working area identified by the window W illustrated in FIG. 2, a measurement of correlation between the pixels is determined in order to understand whether the latter belong or not to one and the same object of the scene under examination. The object or portion thereof inside the window W will be hereinafter also referred to as pattern P.

In order to select the best pattern P corresponding to the object present in the window W, a merit parameter is calculated, referred to as "score" G, which takes into account the correlations between the pixels present in the work window W.

The correlation between pairs of pixels is measured by calculating a function, referred to as cost function F. The cost function that is applied depends on a degree of correlation or non-correlation between the pairs of pixels.

The number of the pairs of pixels depends upon the size of the window W and the number of patterns P identified within the window.

The pairs are then used for calculation of the score G of each of the aforesaid patterns P identified.

Calculation of the score G is based upon two fundamental points: analysis of directional correlation and analysis of whether they belong to an object (pattern).

The best score G is then used to identify the pixels R that are to be used for reconstructing the missing datum. Also identified is the modality with which said pixels R are to be processed in order to obtain the best result in the final filtering process.

In order to increase the robustness of the process in the event of an error, for example in presence of noise, details, uncertain decisions, etc., there is preferably adopted a modality of flow of recognition of the best pattern by means of a targeted use of certain threshold values S, in order to discriminate as well as possible the values of the scores G. The discrimination is performed on the basis of intrinsic characteristics of the patterns P, which will be clarified in what follows.

In brief, the de-interlacing technique according to the invention envisages carrying-out of the following macrosteps:

creation of the work window W, with selection of R points of the D lines (or rows);

creation of all the possible rectangular and polygonal patterns P within the aforesaid window W;

selection of the patterns P to be considered within the window W;

choice of the cost function F for measurement of the correlations between pairs of pixels;

choice of the cost function FN for measurement of the non-correlations between pairs of pixels;

for each pattern, choice of the number and type of internal correlations and external non-correlations to be calculated;

calculation of the scores G for all the candidate patterns previously selected, using the cost function F previously chosen;

for each pattern, choice of the threshold values S with which the score in the search flow for seeking the "best pattern" is to be compared;

search for the best candidate pattern by an appropriate search flow, and targeted use of threshold values S;

on the basis of the best pattern previously found, choice of the pixels R of the window W that are to form part of the final filtering process;

on the basis of the best pattern, choice of the best modality according to which said pixels are to be considered and used in the filtering process; and application of the interpolation filter.

At this point, the missing information is reconstructed and can be transmitted and/or stored.

The transmission operation must respect the order and alternation with which the D lines were received at input to the de-interlacing system.

As was said previously, the process of identification of the points that best represent the pixel to be reconstructed is based upon the evaluation of the correlation between the pixels themselves, which is measured by means of the cost function F. It is essential to note that the choice of the cost function F affects the complexity and final quality of the system itself.

Figure 3:
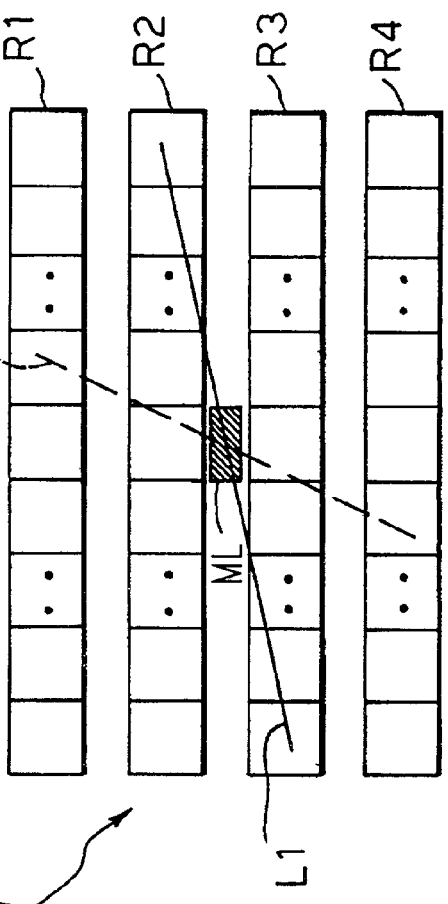
FIG. 3 illustrates the concept of maximum and minimum slope in the work window of the solution according to the invention.

FIG. 3 represents a work (or search) window W comprising four lines R1, R2, R3 and R4, between which there lies (in a central position) the point or pixel M to be reconstructed. Again in FIG. 3, L1 and L2 designate two lines, respectively of minimum slope and maximum slope for the purposes of determination of the correlation. The representation of FIG. 3 is, in any case, provided purely by way of example, in particular as regards the number of lines represented.

The patterns used, denoted by P, are patterns of a rectangular type and a polygonal type, with the aim of considering the possible patterns of different thickness inside the window W. By then discriminating only the patterns passing through the point of the pixel to be reconstructed, the one that best enables said reconstruction without introducing artifacts into the image is selected.

It will be appreciated in particular that the patterns P present generic areas which depend upon the generic diagonal direction used for defining said patterns.

For a correct identification of the patterns, the dual search for the correlation and non-correlation of the pixels inside and outside the pattern P under examination is considered. From the above analyses it will then be possible to identify the subset of the points within the window W that will form the basis for the subsequent and final filtering process.

The various patterns are then classified according to appropriate scores G. These scores are then verified by means of appropriate selection criteria, which are essentially based upon the characteristics themselves of each pattern examined. An index, referred to as "index of the directionality of the pattern" has moreover been added for identification of the types of patterns. The index of the directionality identifies the main direction of the diagonal component of each pattern P.

Figure 4:
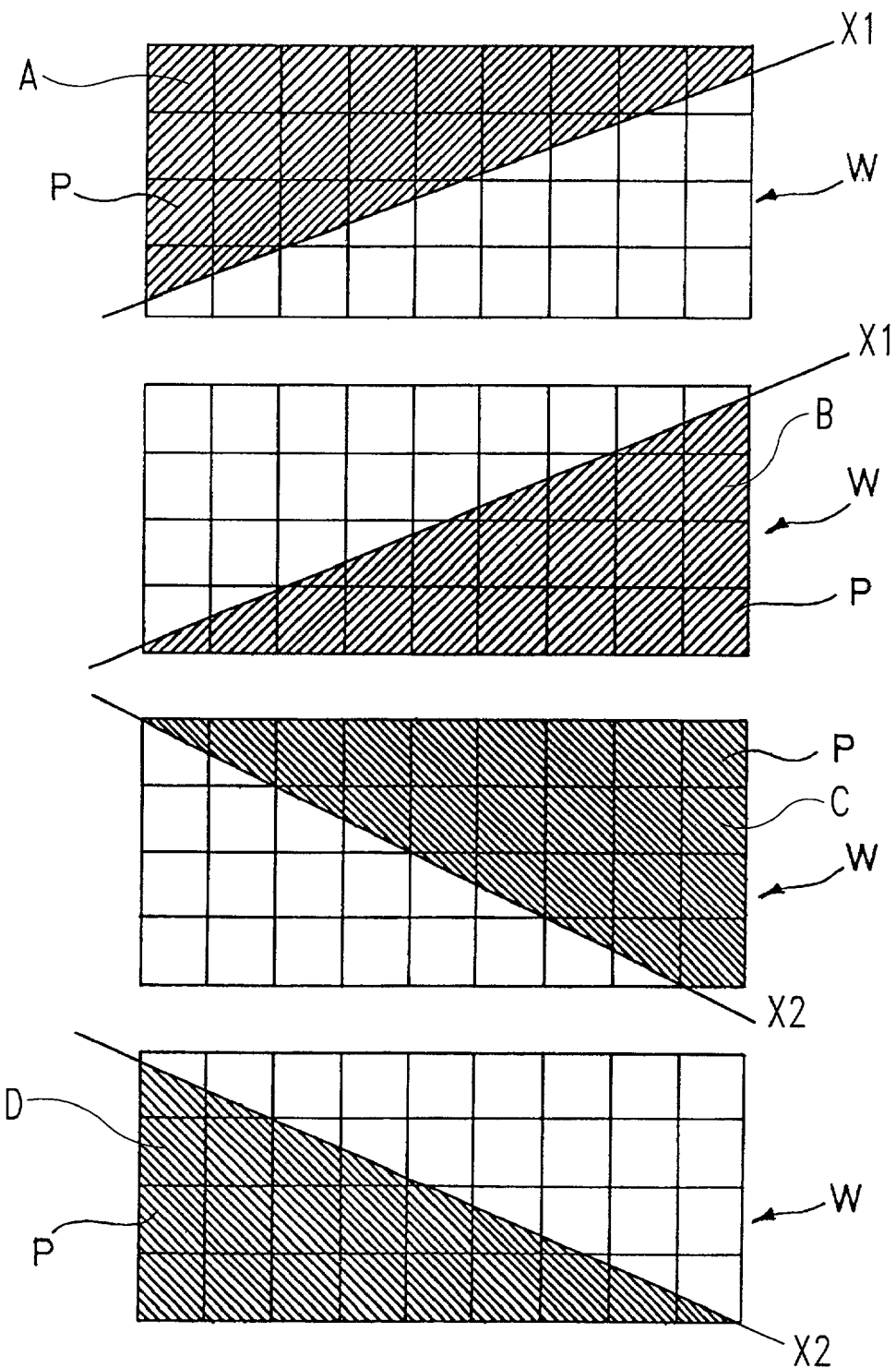
FIG. 4 shows four macro models of the directions of analysis and the corresponding areas of pertinence of the solution according to the invention.

In the case of the example of polygonal patterns of triangular shape shown in FIG. 4, the directionality index is identified by the diagonal of the triangle itself.

The above example constitutes a specific case and is in no way restrictive of the altogether general nature of the system.

Again with reference to FIG. 4, the inclined side of the triangular polygon has the function of indicating the direction of correlation, whilst the square areas underlying and overlying the diagonal indicate the areas where the region to which the pixel to be reconstructed might belong is sought.

Patterns of a rectangular type have a fixed directionality index of 90 degrees and are used for the search for uniform or non-uniform regions in the neighborhood of the pixel to be reconstructed.

Patterns of a linear type are used for the identification of lines having a thickness of 1 pixel and passing through the pixel to be reconstructed (particular case of the types of previous patterns).

Once again with reference to the example of FIG. 4, it may be noted that in the window W two main directionality indices X1 and X2, and consequently four main areas of pertinence A, B, C and D, are identified.

In what follows (in particular, with reference to the example of FIG. 6), a description will be provided also of the use of the various thresholds S with which first the best patterns P for each area of pertinence are discriminated, and then compared one by one to obtain the best pattern P for each direction of pertinence, and finally to identify the best pattern in absolute terms in the window W.

The experiments conducted by the applicant show that the above solution reduces the cases of erroneous recognition of the pattern P, and hence also reduces the artifacts that may be introduced.

There have moreover been identified various sets of thresholds S, the values and uses of which depend directly upon their use within the search flow for seeking the best solution. In particular, three main families of thresholds S have been identified:

Threshold for Each Pattern P

Each score G calculated is compared with a threshold S in such a way as to eliminate the patterns that have a high degree of uncertainty. In addition, according to the specific type of pattern P, different threshold values are used to prevent penalizing the less likely patterns. For example, patterns with a very gentle diagonal slope prove intrinsically less likely, and hence could prove, to be constantly penalized if compared with patterns having a steep slope.

Thresholds for Selection of the Patterns Belonging to One and the Same Directionality Index These are used for discriminating the cases of specular ambiguity of two opposite areas along the same direction.

Thresholds for Selection of the Patterns Belonging to Opposite Directionalities

These are used to solve the cases of ambiguity in the event of opposite directions.

The operating flow defined by the proposed solution defines the progressive selection of the winning patterns P along the various cases defined previously.

In general, the aforesaid thresholds S are used in order to solve the cases of ambiguity in the event of high degrees of correlation between two or more scores of the patterns under examination (equiprobable patterns).

In the comparison between two patterns, the function of correlation between the two corresponding scores is compared with the threshold. In the case where the two patterns prove equiprobable it is necessary to adopt an adequate methodology to solve the ambiguity. The methodology may consist in eliminating the two candidate patterns from the algorithm for choice of the best pattern, or else in using a default function chosen beforehand. The choice is linked to the difference between the two candidate patterns, and hence to the criticality of a possible erroneous choice, which may lead, for example, to a polarization of the interpolation in a certain direction.

The threshold values S are not fixed a priori, but may be defined even during application of the system.

Figure 5:
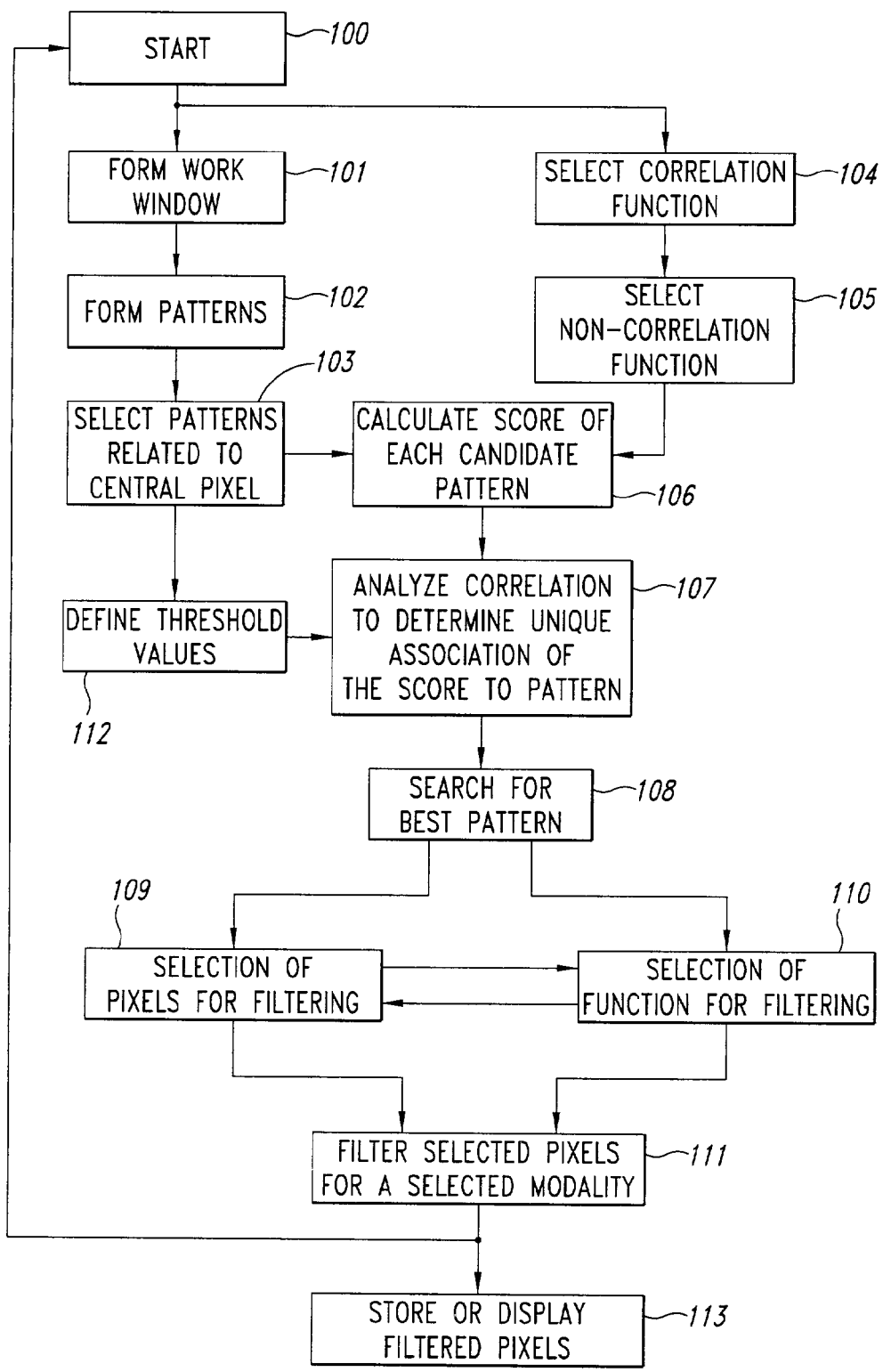
FIG. 5 is a schematic illustration of the flow of the process of de-interlacing of the video signal of the solution according to the invention.

The flowchart of FIG. 5 illustrates, in greater detail, the development of the operating sequence upon which the operation of the solution according to the invention is based.

Starting from a start step 100, the process envisages the construction (according to the modalities described previously) of the work window W. This operation is schematically represented by the step 101.

Next, all the possible patterns inside the work window are constructed (step 102), and this is followed by a step of selection (step 103) of those patterns alone that are related to the central pixel of the work window W, i.e., the pixel to be reconstructed.

At the same time, the correlation function (step 104) and non-correlation function (step 105) are selected, which will serve for the computation of the scores G of the patterns selected in step 103.

At this point, there are available all the elements necessary for the actual calculation of the score (step 106) of each candidate pattern. In this step there are in fact considered the correlation between the points inside the pattern in question, the correlation between the pixels outside the pattern, and finally the non-correlation between the pixels inside and outside the pattern.

In order to improve the identification of an area of pertinence of the datum to be reconstructed, the aforesaid correlations are calculated as a function of the correlations calculated along the perimeter of the pattern under examination, as a function of the correlations calculated in the area of the pattern under examination, as a function of the correlations calculated outside the perimeter of the pattern in question, and finally as a function of the non-correlations in the direction inside-outside the pattern.

The value of the score associated to the pattern is thus a function (step 107) of the analyses of correlation, both internal and external, described previously, in such a way as to identify uniquely the pattern with its corresponding score.

The above step is directly connected to the use of certain threshold values corresponding to specific patterns, so as to even out the probability of selection for each pattern, as explained previously. The step (step 112) hence establishes, according to the selection of the patterns made during step 103, the threshold values for the patterns thus defined.

Figure 6:
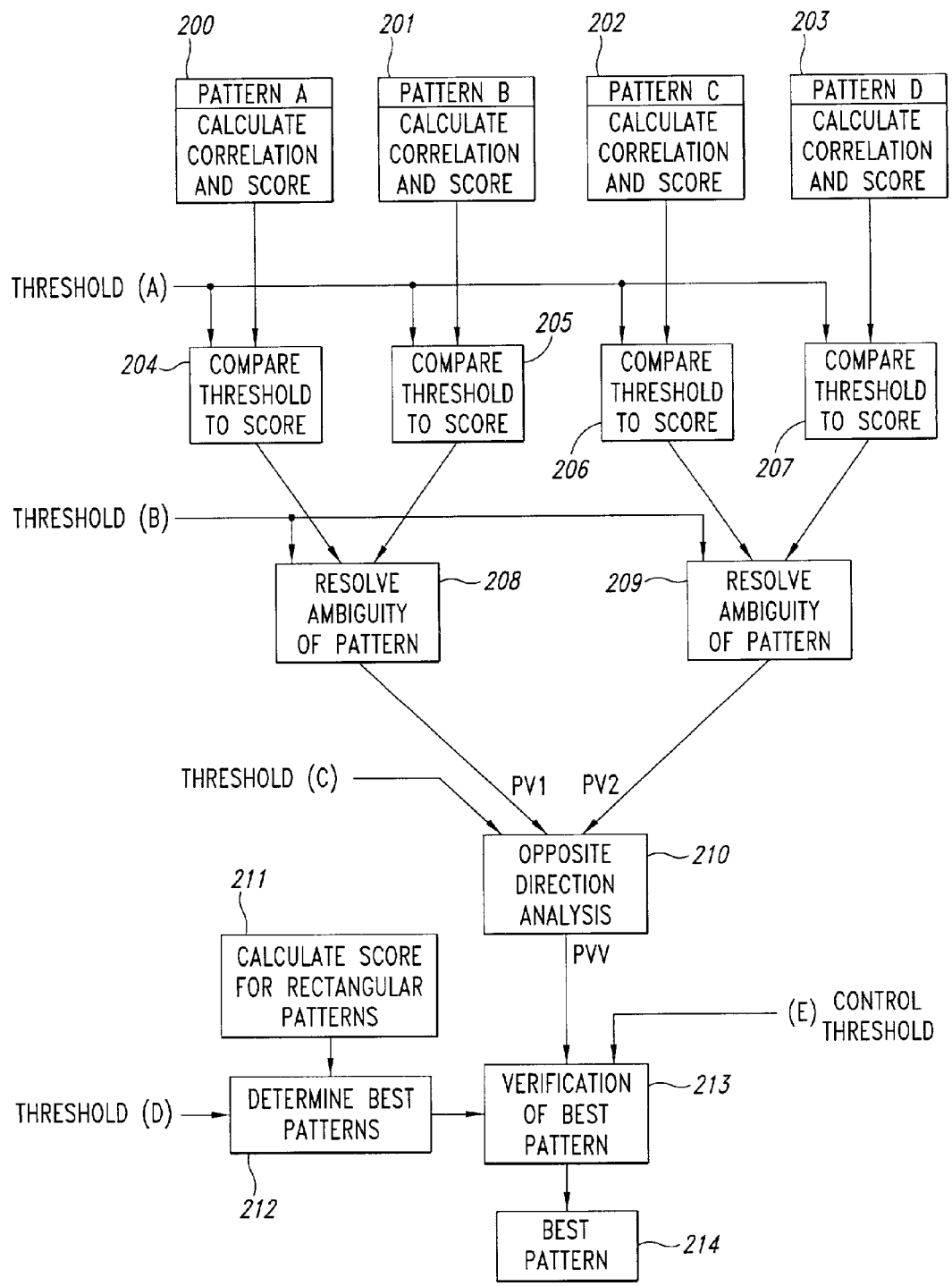
FIG. 6 illustrates in particular the internal flow of the search block for seeking the best solution using the solution according to the invention.

At the end of the calculation carried out in step 107, there are available all the scores necessary for the search for the best solution within the window W. This search step (step 108) constitutes the central part of the process for determining the best pattern, and it is on this step that there depends the quality of the subsequent process of selection of the most suitable pixels, and hence also the way in which they are to be processed in order to reconstruct the missing information in the best possible way. Step 108 will be analyzed in further detail later on, at the end of the description of the present work flow (FIG. 6).

At the end of step 108, it is thus possible to proceed simultaneously, in step 109 and step 110, respectively to the selection of the pixels that depend upon the best pattern previously calculated, and to the choice of the function that is to be applied to the pixels for the final filtering process.

As has been said, the final step 111 consists precisely in the operation of filtering the pixels selected, according to the modality selected. The modality may be carried out by using linear and nonlinear functions, according to the particular type of pattern or to the implementational choices made.

Once step 111 is through, the process may be repeated iteratively in order to reconstruct the remaining pixels that are missing within the image lines of the interlaced image, and proceeding to storage and/or display of the pixels (step 113).

It is important to remember that each iteration of the process of calculation, analysis and reconstruction does not involve any assumption on the results obtained in the previous iterations, so as not to propagate possible errors.

FIG. 6 provides a detailed illustration of the part of the system for search for the best solution of step 108 of FIG. 5 within the patterns P selected inside the work window W.

The process consists in the parallel search for two basic types of patterns, namely, the so-called diagonal patterns and the so-called rectangular patterns. As far as linear patterns are concerned, these fall within the two cases mentioned above, in view of the fact that they may be identified as polygonal and/or rectangular patterns having the thickness of 1 pixel.

In the branch of search for the best solution within the diagonal patterns, four steps that can be processed in parallel may be identified. The steps, 200, 201, 202 and 203, have the function of calculating the correlations and corresponding scores of the patterns belonging to the four categories of diagonal patterns A, B, C and D, as represented schematically in FIG. 4. The four categories are precisely those in which the two diagonal macro-directions establish four macro-areas where it is possible to construct the diagonal patterns.

In order to reduce the number of cases to be analyzed to the ones that have the highest probability of being selected as winning solutions at the end of the entire search process, each score for each pattern is compared with an appropriate threshold value (A)—steps 204, 205, 206, and 207.

Within each of the four categories, it thus established which of the patterns originally considered as likely is recognized with the highest degree of certainty.

It is thus possible to establish the most significant pattern for each of the four categories of patterns—final phase of the aforesaid steps 204, 205, 206, and 207.

There will then be defined two representatives of the two different directionalities defined previously (FIG. 4).

The cases of ambiguity that arise with a similar score among different patterns belonging to the same area are resolved by selecting the least likely pattern among the best ones, the recognition of which is thus rewarded.

Next, the winning patterns PV are analyzed again in order to improve the selection further. A function of analysis between pairs of patterns PV and a further threshold (B) are then applied. The winning patterns are previously grouped according to a criterion of pertinence to their own directionality.

Once again, the cases of ambiguity that occur with a high correlation between different patterns belonging to different areas—a value indicated by the threshold (B)—are resolved by choosing a default solution that operates a non-critical filtration. It is clear that this default solution is chosen uniquely in the cases where in both of the flows—step 208 and step 209—the ambiguities occur.

There are then defined two representatives of the two directionalities defined. These patterns are the winning patterns PV1 and PV2, each consisting of the winners in steps 204 and 205, on the one hand, and the winners in steps 206 and 207, on the other. This step is goes by the name of specular analysis with respect to a diagonal direction.

The same applies to the next step 210, in which the winning patterns PVV are analyzed together and with an appropriate threshold (C). This verification process follows the same methodology as that defined in the previous step. Again, in the case where more than one pattern prove to be equally winning, in the present case it is advisable to opt for a default solution chosen a priori, in such a way as to prevent a polarization of the selection process. This step goes by the name of opposite directional analysis.

In the branch of search for the best solution within the rectangular patterns, the scores of the patterns that have no diagonality are calculated. This step (step 211) determines the best pattern in terms of uniform regions present in the search window. This pattern is then analyzed together with an appropriate threshold (D) in order to certify its actual probability of final selection.

The final step, verification of the best pattern, which concludes the search process for the best pattern (step 213) considers then the diagonal winning pattern, the vertical winning pattern, and a further control threshold (E). This verification process follows the same methodology as that defined in the previous step. The output (214) of this step constitutes the winning pattern in absolute terms among all the possible patterns within the work window W.

The solution so far described essentially corresponds to the search for the minimum value among the correlations of the patterns identified, and hence to the identification of the pixels to be used in the final filtering process.

The flow proceeds with the determination of the pixels that will concur in the subsequent filtering process, and hence in the choice of the modality with which the latter is implemented.

For this purpose, selection rules are followed that depend upon the characteristics themselves of the winning pattern: patterns with a very gentle diagonality suggest the use of both pixels belonging to the pattern itself and pixels in the region outside the pattern; patterns with a very steep diagonality suggest the use of pixels belonging only to the pattern itself; intermediate degrees of diagonality entail the adoption of empirical rules for the selection of the pixels for the final filtering step.

As regards the subsequent filtering step, the solution according to the invention envisages selection between linear and non-linear techniques to be applied to the process. The choice of one technique or another depends upon various factors, such as the type of winning pattern selected, the number of pixels belonging to the aforesaid pattern which are considered, and other factors that are strictly linked to the choices for the implementation of the final system.

It has been determined that gentler slopes are indicative of a lower correlation between the pixels belonging to the diagonal of the pattern, and hence the choice of a non-linear function that tends to preserve the values of the original pixels intrinsically has a higher probability of introducing artifacts that are visible in the final image; vice versa, in the case of patterns with steeper slopes.

Figure 7:
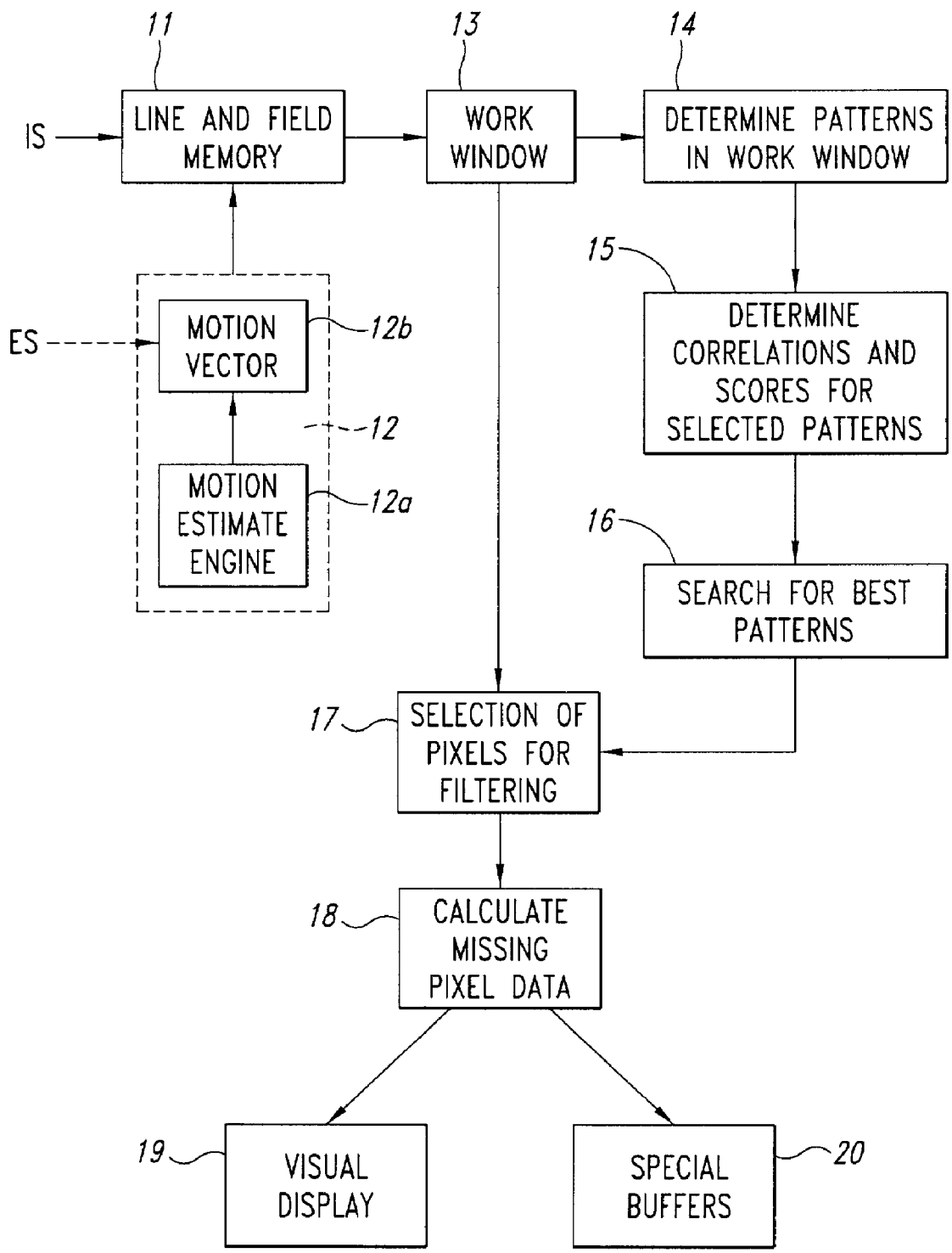
FIG. 7 illustrates, in the form of a block diagram, the structure of the entire processing model of the solution according to the invention.

The block diagram of FIG. 7 illustrates in general the structure of a processing system designed to generate, starting from an input signal IS consisting of a digital video signal in "interlaced" format (i.e., one in which pixels of the even lines and odd lines are transmitted alternately) into an output signal OS organized in a progressive format. The output signal OS can be displayed on an appropriate display, or else can be stored for further processing.

In the diagram of FIG. 7, the reference number 11 designates a storage buffer, of a known type, that performs the function of line and field memories. The data at output from this block can possibly depend upon motion information.

The reference number 12 represents a block corresponding to a motion-compensation system comprising a motion-estimation engine 12a, which, possibly co-operating with an external source ES, supplies the input to a module 12b for determination of the motion vectors. The block may supply the motion vectors received from outside, or else calculate them with an appropriate motion-estimation system and corresponding connection to the input buffer.

The reference number 13 designates a block in which the work window is provided on which the rules for search for the pattern, 14, 15 and 16, and for selection of the pixels, 17, for the final filtering operation 18 are applied.

The reference number 14 designates the block for determining and selecting the patterns applicable within the window in step 13.

The reference number 15 designates the module for calculation of the correlations of the pixels of the window W and the function of composition of the scores G of the patterns selected in step 14.

The reference number 16 designates the module for search for the best pattern P within the work window W in order to reconstruct the missing datum within the window W.

The reference number 17 designates the block for selection of the pixels for the subsequent filtering process. Said pixels will be selected within the window W on the basis of the best pattern estimated in step 16 and of the filtering modality.

The reference number 18 designates the final filtering module in which the datum missing in the window W is calculated exactly, and hence the filtering module constitutes the final part of the de-interlacing engine. Subsequently, the progressive data constituting the output signal OS can be displayed on an appropriate progressive-scanning visual display 19, or else can be stored in special buffers 20, for possible further processing.

Of course, without prejudice to the principle of the invention, the details of construction and the embodiments may vary widely with respect to what is described and illustrated herein, without thereby departing from the scope of the present invention as defined in the annexed claims.

What is claimed is:

1. A process for converting into progressive format digital images organized in half-frames or fields with interlaced lines or rows, comprising the operations of:
   selecting a set of successive lines of one of said fields; and
   reconstructing by pixels an image line set between the successive lines of said set, the successive lines of said set defining a work window, said reconstruction operation comprising the steps of:
   creating a set of candidate patterns associated to said work window by selecting the candidate patterns to be considered within said work window;
   applying to the candidate patterns of said set of candidate patterns a first cost function which is representative of the correlations between pairs of pixels;
   applying to the candidate patterns of said set of candidate patterns a second cost function which is representative of the non-correlations between pairs of pixels;
   selecting, for each candidate pattern, respective internal correlations and external non-correlations, calculating corresponding scores for said candidate patterns using said first cost function;
   selecting a best pattern by comparing the corresponding scores of the candidate patterns with a threshold; and
   selecting the pixels of said work window identified by the best pattern selected, reconstructing said image line by filtration starting from said pixels.

2. The process according to claim 1, wherein said score is based on an analysis of a directional correlation and on an analysis of a pertinence to an object.

3. The process according to claim 1, wherein said patterns are polygonal patterns in a framework of said work window.

4. The process according to claim 3, wherein said patterns are patterns of a rectangular or triangular type.

5. The process according to claim 3, wherein said patterns are patterns of a triangular type.

6. The process according to claim 3, wherein said patterns present a diagonal component, the diagonal component having a direction of which identifies a corresponding index of directionality.

7. The process according to claim 1, wherein an area of said candidate patterns is indicative of an object of pertinence to a framework of said images.

8. The process according to claim 1, further comprising an operation of discriminating said candidate patterns by means of a threshold for countering an effect of erroneous recognition of the candidate patterns themselves with consequent possible generation of artifacts.

9. The process according to claim 8, wherein said operation of applying the threshold includes the application of thresholds from the group consisting of:
   thresholds for each candidate pattern by elimination of the candidate patterns with a high degree of uncertainty;
   thresholds for selection of the candidate patterns having an index of directionality that is the same; and
   thresholds for selection of the candidate patterns having a directionality being opposite.

10. The process according to claim 1, further comprising an operation of subjecting the pixels of said reconstructed image line to an interpolation operation.

11. The process according to claim 1, wherein said corresponding scores for the candidate patterns include:
   a correlation between the pixels inside the candidate pattern;
   a correlation between the pixels outside said candidate pattern; and
   a non-correlation between the pixels inside and outside said candidate pattern.

12. The process according to claim 11, wherein said correlations are calculated as functions chosen in the group consisting of:
   correlations calculated along a perimeter of the candidate pattern;
   correlations calculated in an area of the candidate pattern;
   correlations calculated outside the perimeter of the candidate pattern; and
   non-correlations in a direction inside-outside the candidate pattern.

13. A system for converting into progressive format digital images organized in half-frames with interlaced lines, comprising:

a selection set for selecting a set of successive lines of said field; and a processing set for reconstructing by pixels an image line set between the successive lines of said set of successive lines of said field;

and said selection set is configured for:

defining, starting from the successive lines of said set of successive lines, a work window having a patterns;

creating a set of candidate patterns associated to said work window by selecting the patterns to be considered within said work window;

applying to the candidate patterns of said set of candidate patterns a first cost function which is representative of the correlations between pairs of pixels;

applying to the candidate patterns of said set of candidate patterns a second cost function which is representative of the non-correlations between pairs of pixels;

selecting, for each candidate pattern, respective internal correlations and external non-correlations, calculating corresponding scores for said candidate patterns using said first cost function;

selecting a best pattern by comparing the corresponding scores of the candidate patterns with a threshold; and selecting the pixels of said work window identified by the best pattern selected, reconstructing said image line by filtration starting from said pixels.

14. The system according to claim 13, wherein the processing set calculates said score by analysis of a directional correlation and analysis of a pertinence to an object.

15. The system according to claim 14, wherein the selection set comprises a memory for storing at least part of one of said successive lines of said selection set.

16. The system according to claim 13, wherein said candidate patterns are polygonal patterns in a framework of said work window.

17. The system according to claim 16, wherein said candidate patterns are a rectangular or triangular type.

18. The system according to claim 16, wherein said candidate patterns are triangular patterns.

19. The system according to claim 16, wherein said candidate patterns present a diagonal component, the diagonal component having a direction of which identifies a corresponding index of directionality.

20. The system according to claim 13, wherein an area of said candidate patterns is indicative of an object belonging in a framework of said images.

21. The system according to claim 13, wherein said processing set is configured to discriminate said candidate patterns by means of a threshold for countering the effects of erroneous recognition of the candidate patterns themselves with consequent possible generation of artifacts.

22. The system according to claim 21, wherein said processing set is configured for applying thresholds from the group consisting of:

thresholds for each candidate pattern by elimination of the candidate patterns with a high degree of uncertainty;

thresholds for selection of the candidate patterns with the same index of directionality; and thresholds for selection of the candidate patterns having opposite directionalities.

23. The system according to claim 13, wherein said processing set is configured to subject the pixels of said reconstructed image line to an interpolation operation.

24. The system according to claim 13, wherein said processing set calculates said corresponding scores for the candidate patterns, including:

a correlation between the pixels inside the candidate pattern;

a correlation between the pixels outside said candidate pattern; and a non-correlation between the pixels inside and outside said candidate pattern.

25. The system according to claim 24, wherein the correlations are calculated as functions from the group consisting of:

correlations calculated along a perimeter of the candidate pattern;

correlations calculated in an area of the candidate pattern;

correlations calculated outside the perimeter of the candidate pattern; and non-correlations in the direction inside-outside the candidate pattern.

26. A computer program product directly loadable in the memory of a digital computer comprising software code portions for performing the following steps when said product is run on a computer:

selecting a set of successive lines of one of said fields; and reconstructing by pixels an image line set between the successive lines of said set, the successive lines of said set defining a work window, said reconstruction operation comprising the steps of:

creating a set of candidate patterns associated to said work window by selecting the candidate patterns to be considered within said work window;

applying to the candidate patterns of said set of candidate patterns a first cost function which is representative of the correlations between pairs of pixels;

applying to the candidate patterns of said set of candidate patterns a second cost function which is representative of the non-correlations between pairs of pixels;

selecting, for each candidate pattern, respective internal correlations and external non-correlations, calculating corresponding scores for said candidate patterns using said first cost function;

selecting a best pattern by comparing the corresponding scores of the candidate patterns with a threshold; and selecting the pixels of said work window identified by the best pattern selected, reconstructing said image line by filtration starting from said pixels.

27. A process of converting an image comprising:

selecting a plurality of lines of a first format wherein the plurality of lines is formed of a plurality of pixels of a first image;

selecting a work window having a plurality of patterns wherein the plurality of patterns is formed of a subset of pixels of the plurality of pixels of the first image;

determining a plurality of candidate patterns from the plurality of patterns of the work window;

determining correlations of pairs of pixels of the work window to determine if the pairs of pixels are associated with a selected pattern of the plurality of candidate patterns;

determining a score of the selected pattern;

comparing a threshold to the score of the selected pattern to obtain a best pattern; and determining a target pixel of the subset of pixels of the plurality of pixels of the best pattern wherein the target pixel forms a portion of a second image in a second format.

28. The process according to claim 27 wherein determining the correlations of the pairs of pixels includes applying a cost function representative of a degree of the correlation to the selected pattern.

29. The process according to claim 27 wherein comparing the threshold to the score further includes selecting a first threshold of selected patterns having a steep slope.

30. The process according to claim 27 wherein comparing the threshold to the score further includes selecting a second threshold of selected patterns having first and second areas wherein the areas are opposite and in the same direction.

31. The process according to claim 27 wherein comparing the threshold to the score further includes selecting a third threshold of selected patterns having an opposite direction.

32. The computer program product according to claim 26, wherein said score is based on an analysis of a directional correlation and on an analysis of a pertinence to an object.

33. The computer program product according to claim 26, wherein said patterns are polygonal patterns in a framework of said work window.

34. The computer program product according to claim 26, wherein said patterns present a diagonal component, the diagonal component having a direction of which identifies a corresponding index of directionality.

35. The computer program product according to claim 26, further comprising software code portions for performing the following when said product is run on a computer: discriminating said candidate patterns by a threshold for countering an effect of erroneous recognition of the candidate patterns themselves with consequent possible generation of artifacts.

36. The computer program product according to claim 35, wherein said discriminating said candidate patterns by the threshold includes applying thresholds from a group consisting of:

thresholds for each candidate pattern by elimination of the candidate patterns with a high degree of uncertainty;

thresholds for selection of the candidate patterns having an index of directionality that is the same; and thresholds for selection of the candidate patterns having a directionality being opposite.

37. The computer program product according to claim 26, further comprising software code portions for performing the following when said product is run on a computer: subjecting the pixels of said reconstructed image line to an interpolation operation.

38. The computer program product according to claim 26, wherein said corresponding scores for the candidate patterns include:

a correlation between the pixels inside the candidate pattern;

a correlation between the pixels outside said candidate pattern; and a non-correlation between the pixels inside and outside said candidate pattern.

39. The computer program product according to claim 39, wherein said correlations are calculated as functions chosen in the group consisting of:

correlations calculated along a perimeter of the candidate pattern;

correlations calculated in an area of the candidate pattern;

correlations calculated outside the perimeter of the candidate pattern; and non-correlations in a direction inside-outside the candidate pattern.

* * * * *